Patented June 10, 1930

1,762,978

UNITED STATES PATENT OFFICE

IVAN GUBELMANN, HENRY J. WEILAND, AND OTTO STALLMANN, OF SOUTH MILWAUKEE, WISCONSIN, ASSIGNORS TO THE NEWPORT COMPANY, OF CARROLLVILLE, WISCONSIN, A CORPORATION OF DELAWARE

3'-AMINO-4'-ALKYL ETHERS OF ORTHO BENZOYL BENZOIC ACID AND THE PROCESS OF MAKING SAME

No Drawing.    Application filed June 28, 1926.    Serial No. 119,248.

This invention relates to 3'-amino-4'-alkyl ethers of ortho-benzoyl-benzoic acid and to a process of preparing the same.

We have discovered that 3'-amino-4'-alkyl ether derivatives of ortho-benzoyl-benzoic acids can be prepared by the reduction of the corresponding nitro alkyl ether bodies. The general reaction may be expressed by the following chemical equation:

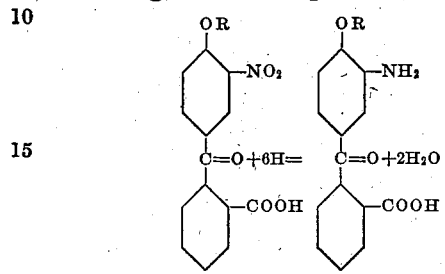

The method of reduction used is similar to the general method of reducing nitro bodies with iron dust and dilute acid. However, we do not wish to limit our method to any specific reduction process, since the nitro ethers can be reduced by other well known methods, such as electrolytically, by hydrogen and a catalyst, by tin and hydrochloric acid and the like.

The amino ethers thus formed are in general microscopic crystals having a pale yellow color. The methyl ether is slightly soluble in alcohol and the ethyl ether more soluble. The ethers are practically insoluble in benzol, chloroform and other organic solvents. They are, however, soluble in caustic soda, soda ash and ammonia, but only slightly soluble in weak mineral acid. In an excess of weak mineral acid the amino ethers go into solution forming the corresponding salts. The melting point of the 3'-amino-4'-methoxy-ortho-benzoyl-benzoic acid is 207° C. (decomposition); of the 3'-amino-4'-ethoxy-ortho-benzoyl-benzoic acid, the melting point is 191°–192° C. (decomposition).

Without limiting our invention to any particular procedure, the following example, in which parts by weight are given, illustrates the application of our invention in the preferred form.

*Example 1—methyl ether*

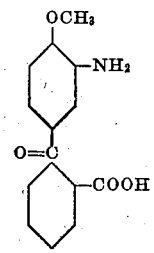

To 3000 parts of water are added 400 parts of iron dust and 37 parts of glacial acetic acid or the equivalent amount of dilute acetic acid. This mixture is heated up to 90 to 95° C. and 301 parts of 3'-nitro-4'-methoxy-ortho-benzoyl-benzoic acid, which has been previously pasted up with 1200 parts of water, are added over a period of 2 to 3 hours. The reaction mass is held at 90 to 95° C. for two hours longer; at the end of which time a solution of 100 parts of soda ash in 500 parts of water is added to the reduction mass. The mass is now heated to 98 to 100° C. and filtered, the filtrate being run into a mixture of 250 parts of hydrochloric acid 20° Bé. and 1000 parts of ice. The acidity of the resulting precipitated mass is adjusted to a weak acidity toward methyl red paper, that is, to an H-ion concentration slightly greater than $10^{-6}$, by the addition of either acid or caustic soda. The precipitated methyl ether is now filtered off and dried at 100° C.; a yield of 245 parts being obtained. The melting point of the crude methyl ether is about 199 to 200° C. By recrystallization from dilute alcohol the crude product may be purified, whereupon the melting point rises to 207° C. (decomposition).

*Example 2—ethyl ether*

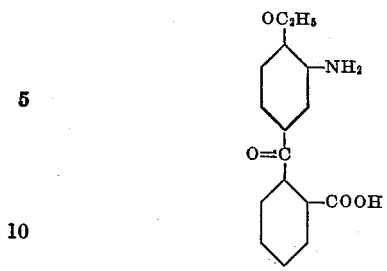

To 3000 parts of water are added 400 parts of iron dust and 37 parts of glacial acetic acid, the same as in Example 1. After heating the mixture up to 90 to 95° C., 315 parts of 3'-nitro-4'-ethoxy-ortho-benzoyl-benzoic acid, which has been previously pasted up with 1200 c. c. of water are added over a period of 2 to 3 hours. The remaining part of the procedure is carried out as in Example 1. The yield of crude ethyl ether is about 257 parts, having a melting point of 188 to 190° C. On recrystallization of the crude ethyl ether from dilute alcohol, the melting point is raised to 191 to 192° C.

We are aware that numerous details of the process may be varied through a wide range without departing from the principles of this invention, and we do not desire limiting the patent granted otherwise than necessitated by the prior art.

We claim as our invention:

1. The process of preparing 3'-amino-4'-alkyl ether-ortho-benzoyl-benzoic acid, which comprises reducing 3'-nitro 4'-alkyl ether-ortho-benzoyl-benzoic acid by means of a metal and an acid adapted to react with said metal to form nascent hydrogen, separating the metallic sludge and adjusting the solution to weak acidity toward methyl red and filtering off the product.

2. The process of preparing 3'-amino-4'-methoxy-ortho-benzoyl-benzoic acid, which comprises reducing 3'-nitro-4'-methoxy-ortho-benzoyl-benzoic acid by means of a metal and an acid adapted to react with said metal to form nascent hydrogen, separating the metallic sludge and adjusting the H-ion concentration of the solution to slightly greater than $10^{-6}$ moles per liter to precipitate the 3'-amino-4'-methoxy-ortho-benzoyl-benzoic acid.

3. The process of preparing 3'-amino-4'-alkyl ethers of ortho benzoyl benzoic acid, which comprises reducing the corresponding 3'-nitro-4'-alkyl ether with iron and acid, filtering off the iron sludge and adjusting the hydrogen ion concentration to slightly greater than $10^{-6}$ to precipitate the 3'-amino-4'-alkyl-ether of ortho benzoyl benzoic acid.

In testimony whereof, we have hereunto subscribed our names.

IVAN GUBELMANN.
HENRY J. WEILAND.
OTTO STALLMANN.